July 30, 1940.  G. L. LARISON  2,209,528
VEHICLE WHEEL SUSPENSION
Filed Dec. 2, 1939  4 Sheets-Sheet 2

Inventor
Glenn L. Larison
By T. J. Geisler
and L. R. Geisler
Attorneys

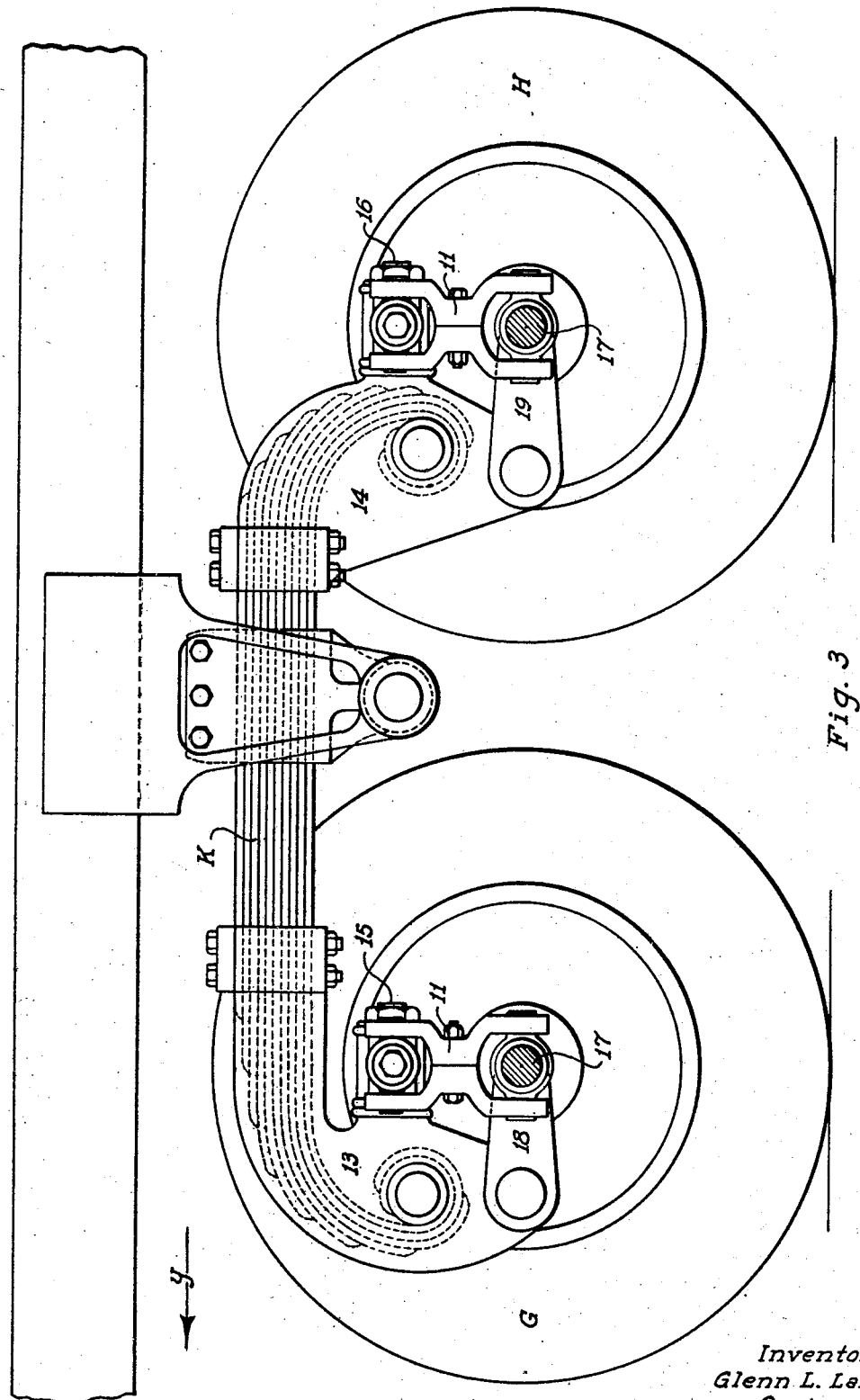

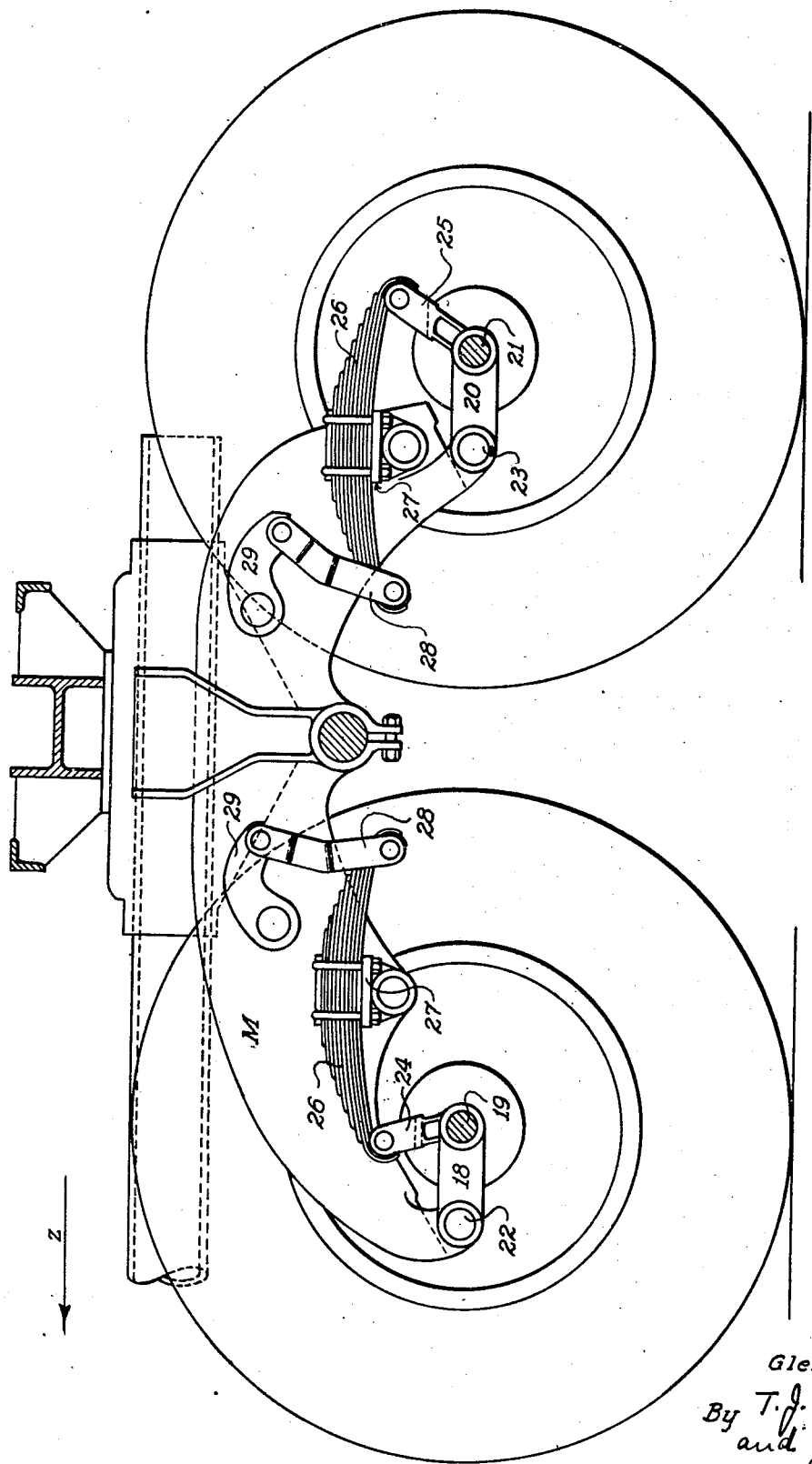

UNITED STATES PATENT OFFICE 2,209,528

VEHICLE WHEEL SUSPENSION

Glenn L. Larison, La Grande, Oreg., assignor to Larison Compensating Axle Corporation, a corporation of Oregon Application December 2, 1939, Serial No. 307,274

3 Claims. (Cl. 280—81)

This application is a continuation in part of my co-pending application, Serial No. 223,275, filed under date of August 5, 1938, and this invention concerns a further modification in the wheel suspension described in my said co-pending application.

Specifically, this invention relates to wheel mounting involving a pivoted longitudinal member, or, more particularly, a "walking beam," in which a pair of wheel-carrying assemblies are supported near each end of the "walking beam."

In the particular construction described and illustrated in the above-mentioned co-pending application, the wheel-carrying assemblies include arms hinged to the "walking beam" for up and down movement in parallel planes, each arm supporting a wheel spindle, so that each wheel will be mounted separately, will roll independently, and may be raised above the other wheels, but the wheels will always be substantially parallel to and spaced a constant distance from the "walking beam," thus eliminating unnecessary and objectionable side slippage of the wheels on the road, which side slippage is produced with certain other forms of wheel mountings. The wheel-carrying assemblies in each pair are connected by means so arranged that an upward movement of one wheel will cause a force to be exerted in the opposite direction on the other wheel-carrying assembly, whereby each wheel is made to carry its full share of the load at all times.

In hinging the wheel-carrying assemblies to the "walking beam" I have, as illustrated in my co-pending application, Serial No. 223,275, extended the two pairs of spindle-supporting arms in opposite directions, thus those at the forward end of the "walking beam" extend forwardly or towards the direction of usual travel of the vehicle, and those at the opposite or rearward end of the "walking beam" extend in the opposite direction or are "trailing." This arrangement of the assemblies and spindle-supporting arms is symmetrical, convenient, and satisfactory under ordinary conditions.

However, I have discovered that when a hinged spindle-supporting arm, or cranked axle, extends forwardly in the line of travel of the vehicle, that is to say, when the wheel is pushed along by such arm or cranked axle, instead of being pulled or "trailed" as occurs when the arm or cranked axle extends in the opposite direction, any sudden hard application of the brake to such wheel, particularly if the vehicle is traveling rapidly, has a tendency to pull the arm downwardly and consequently tends to lift that end of the "walking beam" temporarily. Further, since the braking action of two separate wheels is practically never the same, due to slight differences in the road surface under each, or due to differences in their tire surfaces, tire inflation, etc., a pair of wheels mounted independently but connected by compensating means adapted to distribute the load equally between them, such as the pair of wheels shown in Figure 9 of my co-pending application, Ser. No. 223,275, will offer unequal resistance when brakes are applied on both. In such case, when both wheels are pushed instead of pulled, the arm of the wheel offering the greater resistance has a greater tendency to pull the spindle assembly down, resulting in a tendency for the other wheel to be lifted by the compensating means connecting the two, and thus as a result tending to raise the "walking beam" slightly and temporarily, as well as further increasing the unequal brake action between the pairs of wheels affected by this condition.

I have also found that although the load at each end of the "walking beam" may be the same, the wheels which are mounted ahead of the hinges of their arms, that is those wheels the arms of which extend in a forward direction as previously mentioned, exert a greater braking force than those wheels which are mounted rearwardly of the hinges of their arms or in a "trailing position." While these facts would not ordinarily be noticeable, nevertheless, if such vehicle is given considerable momentum and an attempt is made to stop the vehicle suddenly by applying brakes on all the wheels, the resulting forces will be clearly seen to operate as mentioned and to produce a slight lifting action on portions of the "walking beam," which in turn will be transferred to some extent to the vehicle itself.

The above difficulties however will be entirely eliminated if all the "wheel-carrying" assemblies are mounted in a "trailing" position, or made to extend in a direction contrary to the line of travel of the vehicle. The object of this invention accordingly is to provide a vehicle wheel mounting involving a pivoted longitudinal member or "walking beam" in which the wheel assemblies are hinged in pairs for up and down movement in parallel planes, with means connecting the wheels in each pair so arranged as to cause each wheel constantly to carry its share of the load, but with the wheel-carrying assemblies so arranged that all of the wheels will be mounted in a "trailing" position as the vehicle moves forward.

The manner in which this object is carried out in certain modifications which I have made in the wheel mounting described in my above-mentioned co-pending application, Ser. No. 223,275, will be explained briefly with reference to the accompanying drawings.

In the drawings:

Figure 3 is a side elevation similar to Figure 1, but showing a modified form of "walking beam" similar to the composite spring "walking beam" shown and described in my co-pending application, Ser. No. 258,239, filed under date of February 24, 1939, and entitled "Spring mounting for vehicles;"

Figure 4 is a similar side elevation of an eight-wheel vehicle, with the near-side wheels removed, illustrating the carrying out of my invention with a modified form of wheel mounting, the vehicle wheel mounting in this case being the same as that described in my co-pending application, Ser. No. 293,441 filed under date of September 5, 1939, entitled "Vehicle wheel mounting;"

Figure 5:
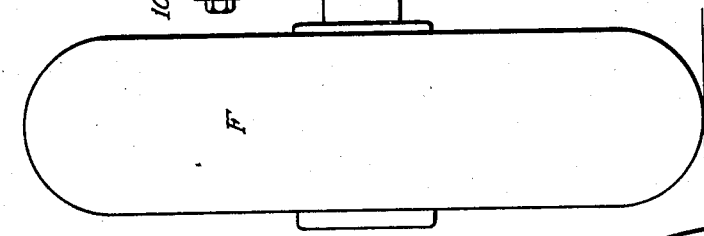
Figure 6:
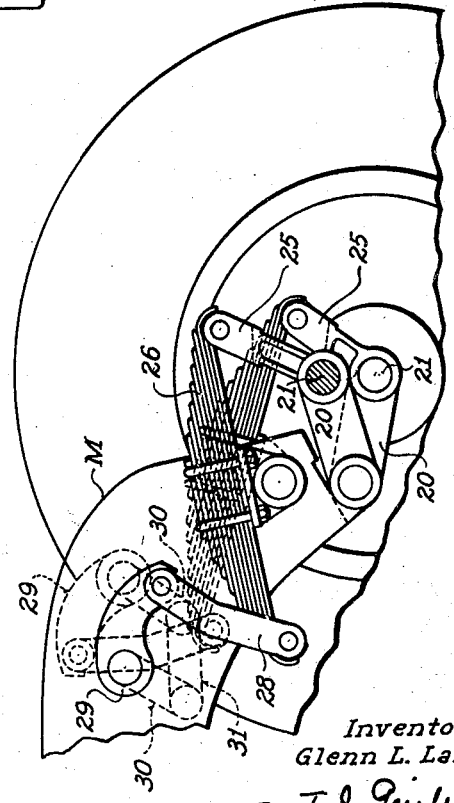

Figure 5 is an end elevation of the wheel mounting of Figure 4 taken from the rear end of one of the "walking beams," and Figure 6 is a fragmentary side elevation, more or less diagrammatic, corresponding in part to Figure 4, showing the rear section of the "walking beam," with one of the rear wheel assemblies raised above the other, illustrating the construction and operation of the means connecting the two assemblies.

Figure 1:
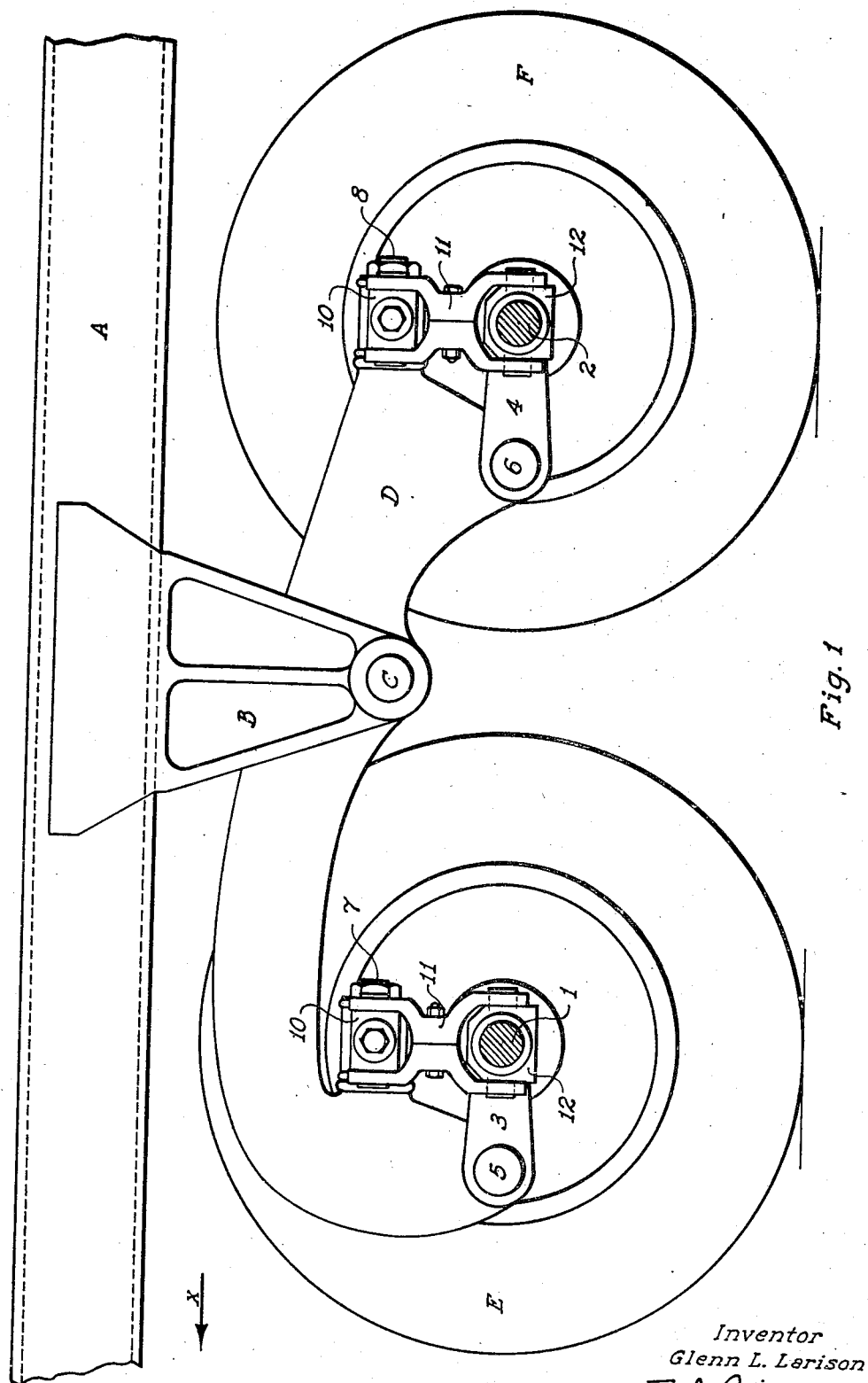
Figure 1 is a side elevation of an eight wheel vehicle embodying my invention, with the forward and rear wheels on the nearside removed in order to show more of the wheel assemblies, the assemblies themselves being the same in general construction as those described in my co-pending application, Ser. No. 223,275.

Referring first to Figure 1, the vehicle illustrated includes a skeleton frame A having depending hangers B supporting a transverse shaft C on which are pivotally mounted a pair of "walking beams" D, one such "walking beam" being shown in Figure 1. A pair of forward wheels E and a pair of rear wheels F are mounted on spindles 1 and 2, respectively the forward spindles 1 being formed integral with, or rigidly secured to, arms 3; and the rear spindles likewise being formed integral with, or rigidly secured to, arms 4. The spindles for each pair of wheels extend from opposite sides of the "walking beam" and are substantially perpendicular to the plane of the "walking beam" and the pairs of arms 3 and 4 are hinged to the "walking beam" at 5 and 6 respectively, the hinges likewise being perpendicular to the "walking beam," so that the wheel-carrying assemblies in each pair may move up and down in parallel planes but the wheels will always be spaced a constant distance from the "walking beam."

Horizontal stub shafts 7 and 8, substantially in alignment with the longitudinal center of the "walking beam" D are rigidly mounted on the "walking beam" at front and rear as illustrated in Figure 1. A transverse rocker 9 (see Fig. 2) is mounted on each of these stub shafts 7 and 8. Pivot blocks 10 are mounted on integral stub shafts at each end of these rockers 9. Links 11, having forked ends, are pivotally connected at the top to the pivot blocks 10, and at the bottom two similar pivot blocks 12, mounted on the wheel spindles. The construction involving the spindle arms, transverse rocker, links, and pivot blocks, is fully described in my co-pending application, Ser. No. 223,275 to which reference is made.

It will be noted that the "walking beam" D in Figure 1, unlike the usual "walking beam," and unlike the "walking beam" I, shown in my application, Ser. No. 223,275, has each end differently shaped in order that the stub shafts 7 and 8 may both extend in the same direction and in order to accommodate compensating means, and so that the pairs of arms 3 and 4 hinged near the ends of the "walking beam" may all extend in the same direction and thus may all be mounted in a "trailing" position, as the vehicle travels in the forward direction indicated by the arrow x. When all the wheel arms are mounted in a "trailing" position in this manner, the dragging of the wheels, due to sudden application of the brakes, produces no tendency for any of the wheel arms to be pulled downwardly and thus no resulting tendency for the corresponding portion of the "walking beam," or the other wheel of the pair, to be temporarily lifted. In other words, the sudden application of brakes to the wheels in a moving vehicle with this modified form of my compensating wheel mounting produces substantially the same effect as in the common type of eight-wheel vehicle wheel suspensions, and any difficulties in braking where such compensating wheel mountings are installed are entirely avoided.

In Figure 3 a composite spring "walking beam" K has been substituted for the rigid "walking beam" D of Figure 1, such a spring "walking beam" being fully described in my co-pending application, Serial No. 258,239, to which reference is made. The caps 13 and 14 secured to the forward and rear ends respectively of the spring "walking beam" are differently shaped in order that the horizontal stub shafts 15 and 16, rigidly mounted in the caps 13 and 14 respectively, may both extend rearwardly and in order that the pairs of arms 18 and 19 supporting the wheel spindles 17 may also extend in this same direction. The stub shafts 15 and 16 are mounted in substantial horizontal alignment with each other and with the longitudinal center line of the "walking beam" K. A transverse rocker is mounted on each of these stub shafts and the ends of the rockers are connected respectively to the wheel spindles by means including the forked links 11, in the same manner as already described with reference to Figures 1 and 2. Thus with this modification in the construction of the "walking beam" it is also possible to carry out my invention and to have all the wheel supporting arms in "trailing" position as the vehicle moves forward in the direction indicated by the arrow y.

Figure 2:
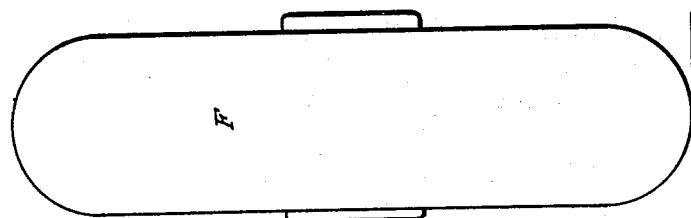
Figure 2 is an end elevation taken from the rear of the vehicle and showing a pair of wheel assemblies and the compensating means connecting the two assemblies mounted at the rear end of one of the "walking beams," the rest of the vehicle being omitted; this figure being similar to Figure 9 in my co-pending application, Ser. No. 223,275.

In the modified construction illustrated in Figure 4, a rigid "walking beam" M is employed, but the means interconnecting the two wheel-carrying assemblies in each pair, instead of comprising a transverse rocker and linkage connecting the ends of the rocker to the wheel spindles, as in the construction shown in Figures 1, 2, and 3, comprises a pair of longitudinal extending spring levers 26, an end of each spring lever 26 being connected respectively to a spindle-supporting arm.

In Figure 4, each of the forward wheel spindles 19 is integral with, or rigidly mounted on, an arm 18 hinged to the "walking beam" at 22. A link 24 connects each spindle arm to the forward end of a longitudinal spring lever 26 secured in a cradle 27 which is pivotally mounted on the "walking beam" for movement in a plane parallel to the "walking beam." The pair of spring levers 26 connected to the front arms 18 are arranged on opposite sides of the "walking beam." The other ends of these spring levers are connected by links 28 to crank arms 29 also on opposite sides of the "walking beam," and the crank arms in each pair are interconnected in such manner that upward movement of one on one side of the "walking beam" will produce downward movement of the other on the opposite side.

The spindles 21 for the rear wheels are carried on arms 20 hinged to the "walking beam" at 23, and the spindle arms 20 are connected by links 25 to the rear ends of a pair of similar longitudinal spring levers 26 respectively. These rear spring levers 26 are mounted and interconnected in the same manner as those at the forward end of the "walking beam." The two wheel-carrying assemblies at the rear of the "walking beam" M and the spring levers to which they are attached will be seen in Figure 5.

Referring now to Figure 6, one means by which the spring levers 26 may be interconnected will be briefly described. In Figure 6, the near-side wheel (which has been removed in the drawing) is assumed to have been raised above the other wheel so that the spindles of the two wheels have been thrown out of horizontal alignment, resulting in the spindle-carrying arms 20 and their spring levers 26, to which the arms are connected by the links 25, being moved correspondingly. Each of the spring levers 26 is connected by a link 28 to a crank arm 29 rotatably mounted in the "walking beam" M. The two crank arms 29 are similar but, as will be seen in Figure 6, extend in opposite directions on opposite sides of the "walking beam." The horizontal shaft of each crank arm has a downwardly extending arm 30 rigidly connected thereto, these downwardly extending arms being located in a chamber within the "walking beam." A link 31, pivotally connected to the lower extremities of each of the downwardly extending arms 30, holds these arms parallel to each other. Consequently a downward movement of the crank arm 29 on the near side of the "walking beam" produces an equal upward movement of the other crank arm 29 on the opposite side. In other words, an upward movement of the end of one spindle arm 20 and of its connected spring lever 26, will cause a force to be exerted in the opposite direction on the other spring lever and spindle arm. This construction is more fully described in my co-pending application, Serial No. 293,441, to which reference is made.

Now referring again to Figure 4, attention is directed to the fact that by slightly altering the shape of the "walking beam" from that shown in my co-pending application, Serial No. 293,441, and by changing the location and arrangement of the forward wheel-carrying assemblies, with their corresponding interconnecting means, I am able to carry out my invention with this form of construction and have all the spindle-supporting arms extend in the same direction, thus providing for all the wheels to be mounted in a "trailing" position as the vehicle moves forward in the direction indicated by the arrow 2.

It is possible similarly to carry out my invention with other modified forms of "walking beams" and longitudinal members, and with various means or compensating linkage connecting the wheel-carrying assemblies in each pair, without departing from the principle of my invention. Further modifications in the particular constructions which I have shown will also suggest themselves. My invention is not to be construed as limited to the particular constructions illustrated. The essential feature common to all the constructions which I have described, and which feature is necessary in the proper carrying out of my invention, is that the hinged wheel-carrying assemblies or cranked arms shall extend in the same direction and in a direction contrary to the ordinary line of travel of the vehicle.

I claim:

1. In a vehicle, a walking beam, pairs of arms hinged to said walking beam, near the ends of said walking beam, for up and down movement with respect to said walking beam, a wheel spindle on each arm, the spindles on each pair of arms extending in opposite directions, the hinges connecting said arms to said walking beam being substantially parallel to said wheel spindles, said arms all extending from their respective hinge connections with said walking beam in a direction opposite to the normal direction of travel of said vehicle, whereby to prevent uneven upward thrust on said walking beam when the forward rolling motion of the vehicle wheels is suddenly restrained, and means connecting the arms in each pair, said means so constructed and arranged that upward movement of one of the wheel spindles of the pair will cause a force to be exerted in the opposite direction on the other wheel spindle of that pair.

2. In a vehicle, a walking beam, pairs of wheel-carrying assemblies hinged to said walking beam, near the ends of said walking beam, for up and down movement, a wheel spindle in each assembly, the spindles of each pair of assemblies extending in opposite directions and normally in transverse alignment with each other, the hinges connecting said assemblies to said walking beam being substantially parallel to said wheel spindles, said assemblies all extending from their respective hinge connections with said walking beam in a direction opposite to the normal direction of travel of said vehicle, whereby to prevent uneven upward thrust on said walking beam when the forward rolling motion of the vehicle wheels is suddenly restrained, and means connecting the assemblies in each pair, said means so constructed and arranged that upward movement of one of the wheel spindles of the pair will cause a force to be exerted in the opposite direction on the other wheel spindle of that pair.

3. In a vehicle, a walking beam, pairs of wheel-carrying assemblies hinged to said walking beam, near the ends of said walking beam, for up and down movement, a wheel spindle in each assembly, the spindles of each pair of assemblies extending in opposite directions, the hinges connecting said assemblies to said walking beam being substantially parallel to said wheel spindles, said hinges in each pair of assemblies being in transverse alignment, said assemblies all extending from their respective hinge connections with said walking beam in a direction opposite to the normal direction of travel of said vehicle, whereby to prevent uneven upward thrust on said walking beam when the forward rolling motion of the vehicle wheels is suddenly restrained, and means connecting the assemblies in each pair, said means so constructed and arranged that upward movement of one of the wheel spindles of the pair will cause a force to be exerted in the opposite direction on the other wheel spindle of that pair.

GLENN L. LARISON.